(12) United States Patent
Lee et al.

(10) Patent No.: US 11,218,033 B2
(45) Date of Patent: Jan. 4, 2022

(54) WIRELESS POWER TRANSMITTER DEVICE, WIRELESS POWER RECEIVER DEVICE, SYSTEM FOR TRANSFERRING POWER WIRELESSLY

(71) Applicant: INDUSTRY-ACADEMIC COOPERATION FOUNDATION, YONSEI UNIVERSITY, Seoul (KR)

(72) Inventors: Yongshik Lee, Seoul (KR); Tae Jun Lim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 233 days.

(21) Appl. No.: 15/674,013

(22) Filed: Aug. 10, 2017

(65) Prior Publication Data

US 2018/0091005 A1 Mar. 29, 2018

(30) Foreign Application Priority Data

Sep. 26, 2016 (KR) .................. 10-2016-0123340

(51) Int. Cl.
*H02J 50/90* (2016.01)
*H01F 38/14* (2006.01)
*H02J 50/12* (2016.01)

(52) U.S. Cl.
CPC .............. *H02J 50/90* (2016.02); *H01F 38/14* (2013.01); *H02J 50/12* (2016.02)

(58) Field of Classification Search
CPC ............ H01F 38/14; H02J 50/12; H02J 50/90
See application file for complete search history.

(56) References Cited

U.S. PATENT DOCUMENTS

| 2010/0225271 | A1 | 9/2010 | Oyobe et al. |
| 2013/0026850 | A1 | 1/2013 | Throngnumchai et al. |
| 2013/0038281 | A1 | 2/2013 | Sakakibara et al. |
| 2013/0127411 | A1 | 5/2013 | Ichikawa et al. |
| 2014/0125145 | A1 | 5/2014 | Bae |
| 2014/0203662 | A1 | 7/2014 | Bae |
| 2015/0051750 | A1* | 2/2015 | Kurs ................. H02J 50/12 700/298 |
| 2016/0012966 | A1* | 1/2016 | Davis ................ H02J 50/12 307/104 |
| 2016/0325630 | A1* | 11/2016 | Dede ................. H02J 7/025 |
| 2017/0054329 | A1 | 2/2017 | You et al. |

FOREIGN PATENT DOCUMENTS

| JP | 2013-090564 A | 5/2013 | |
| JP | 2012-034431 A | 2/2016 | |
| KR | 10-2013-0007173 A | 1/2013 | |
| KR | 10-2015-0032366 A | 3/2015 | |
| WO | WO-2013002488 A1 * | 1/2013 | ............. H02J 17/00 |
| WO | WO 2015-167055 A1 | 11/2015 | |

* cited by examiner

*Primary Examiner* — Toan T Vu
*Assistant Examiner* — Elim Ortiz

(57) ABSTRACT

The present disclosure relates to a wireless power transmitter device, a wireless power receiver device, and a system for transferring power wirelessly. A wireless power transmitter device according to an embodiment of the present disclosure can include: a driving coil configured to transmit power wirelessly; a magnetic coupler mutually inductively coupled with the driving coil; and a resonance frequency adjuster part configured to adjust the resonance frequency of the magnetic coupler, where the magnetic coupler can include a plurality of coils arranged in a region opposite one side of the driving coil.

16 Claims, 12 Drawing Sheets

WIRELESS POWER TRANSMITTER DEVICE, WIRELESS POWER RECEIVER DEVICE, SYSTEM FOR TRANSFERRING POWER WIRELESSLY

CROSS-REFERENCE TO RELATED APPLICATIONS

The present patent application claims priority under 35 U.S.C. § 119(a) to the Korean Patent Application No. 10-2016-0123340, filed on Sep. 26, 2016, which is incorporated herein by reference in its entirety.

BACKGROUND

1. Technical Field

The present disclosure relates to a wireless power transmitter device, a wireless power receiver device, and a system for transferring power wirelessly.

2. Description of the Related Art

With the continuing increase in energy ubiquitous technology in recent times, the field of wireless power transfer is gaining much attention. In particular, there have been research efforts aimed at increasing transfer efficiency in wireless power transfer systems by inserting an additional structure between the power transmitter device and the power receiver device.

Some existing wireless power transmitter and receiver devices for enhancing transfer efficiency do so by increasing the size of the driving coils that transmit and receive power wirelessly or by inserting a number of auxiliary coils between the driving coils.

However, such technology increases the volume of the wireless power transmitter and receiver devices and merely increases transfer efficiency along a linear distance between the transmitter device and the receiver device, and cannot compensate transfer efficiency as regards a misaligned state between the transmitter device and the receiver device. That is, the decrease in transfer efficiency caused by an offset between the transmitter device and the receiver device cannot be compensated.

Thus, there is a need for technology that can increase the efficiency of wireless power transfer even when the transmitter device and the receiver device are misaligned while maintaining the size of the wireless power transmitter and receiver devices.

SUMMARY

One aspect of the present disclosure is to provide wireless power transmitter and receiver devices that can improve transfer efficiency even in the presence of an offset between the wireless power transmitter device and receiver device without increasing the sizes of the wireless power transmitter and receiver devices.

A wireless power transmitter device according to an embodiment of the present disclosure can include: a driving coil configured to transmit power wirelessly; a magnetic coupler mutually inductively coupled with the driving coil; and a resonance frequency adjuster part configured to adjust the resonance frequency of the magnetic coupler, where the magnetic coupler can include a multiple number of coils arranged in a region opposite one side of the driving coil.

In one embodiment, the multiple coils can be arranged along at least one direction of an up/down direction, left/right direction, and a radial direction on the same plane.

In one embodiment, the multiple coils can be arranged symmetrically, and at least two of the multiple number of coils can be provided to have a different area.

In one embodiment, the wireless power transmitter device can further include a sensor part configured to detect a position of a wireless power receiver receiving the power wirelessly.

In one embodiment, the magnetic coupler further can further include variable capacitors installed on the multiple number of coils respectively.

In one embodiment, the resonance frequency adjuster part can adjust the capacitance of a particular variable capacitor from among the variable capacitors according to the position of the wireless power receiver detected by the sensor part.

A wireless power receiver device according to an embodiment of the present disclosure can include: a driving coil configured to receive power wirelessly; a magnetic coupler mutually inductively coupled with the driving coil; and a resonance frequency adjuster part configured to adjust the resonance frequency of the magnetic coupler, where the magnetic coupler can include a multiple number of coils arranged in a region opposite one side of the driving coil.

In one embodiment, the multiple coils can be arranged along at least one direction of an up/down direction, left/right direction, and a radial direction on the same plane.

In one embodiment, the multiple coils can be arranged symmetrically, and at least two of the multiple number of coils can be provided to have a different area.

In one embodiment, the wireless power transmitter device can further include a sensor part configured to detect a position of a wireless power transmitter transmitting the power wirelessly.

In one embodiment, the magnetic coupler further can further include variable capacitors installed on the multiple number of coils respectively.

In one embodiment, the resonance frequency adjuster part can adjust the capacitance of a particular variable capacitor from among the variable capacitors according to the position of the wireless power transmitter detected by the sensor part.

A system for transferring power wirelessly according to an embodiment of the present disclosure can include a power transmitter device that includes a first driving coil configured to transmit power wirelessly, a first magnetic coupler mutually inductively coupled with the first driving coil, and a first resonance frequency adjuster part configured to adjust the resonance frequency of the first magnetic coupler; and a power receiver device that includes a second driving coil configured to receive power wirelessly from the power transmitter device, a second magnetic coupler mutually inductively coupled with the second driving coil, and a second resonance frequency adjuster part configured to adjust the resonance frequency of the second magnetic coupler; where the first magnetic coupler can include a multiple number of first coils that are arranged in a region opposite one side of the first driving coil, and the second magnetic coupler can include a multiple number of second coils that are arranged in a region opposite one side of the second driving coil.

In one embodiment, the multiple number of first coils can be arranged along at least one first direction of an up/down direction, left/right direction, and a radial direction on the same plane, and the multiple number of second coils can be arranged along the first direction.

In one embodiment, the multiple number of first coils can be arranged symmetrically, and at least two of the multiple number of first coils can be provided to have a different area.

In one embodiment, the system can further include a sensor part that may be installed on at least one of the power transmitter device and the power receiver device to measure at least one of the position and the direction of the power receiver device relative to the power transmitter device.

In one embodiment, the first magnetic coupler can further include first variable capacitors installed on the multiple number of first coils, respectively, and the second magnetic coupler can further include second variable capacitors installed on the multiple number of second coils, respectively.

In one embodiment, the first resonance frequency adjuster part can adjust the capacitance of the first variable capacitor according to the horizontal distance or direction difference between the power transmitter device and the power receiver device, and the second resonance frequency adjuster part can adjust the capacitance of the second variable capacitor according to the horizontal distance or direction difference between the power transmitter device and the power receiver device.

An embodiment of the present disclosure can improve transfer efficiency even in the presence of an offset between the wireless power transmitter device and receiver device without increasing the sizes of the wireless power transmitter and receiver devices.

Additional aspects and advantages of the present disclosure will be set forth in part in the description which follows and the appended drawings, and in part will be obvious from the description and drawings, or may be learned by practice of the present disclosure.

DETAILED DESCRIPTION

Figure 1:
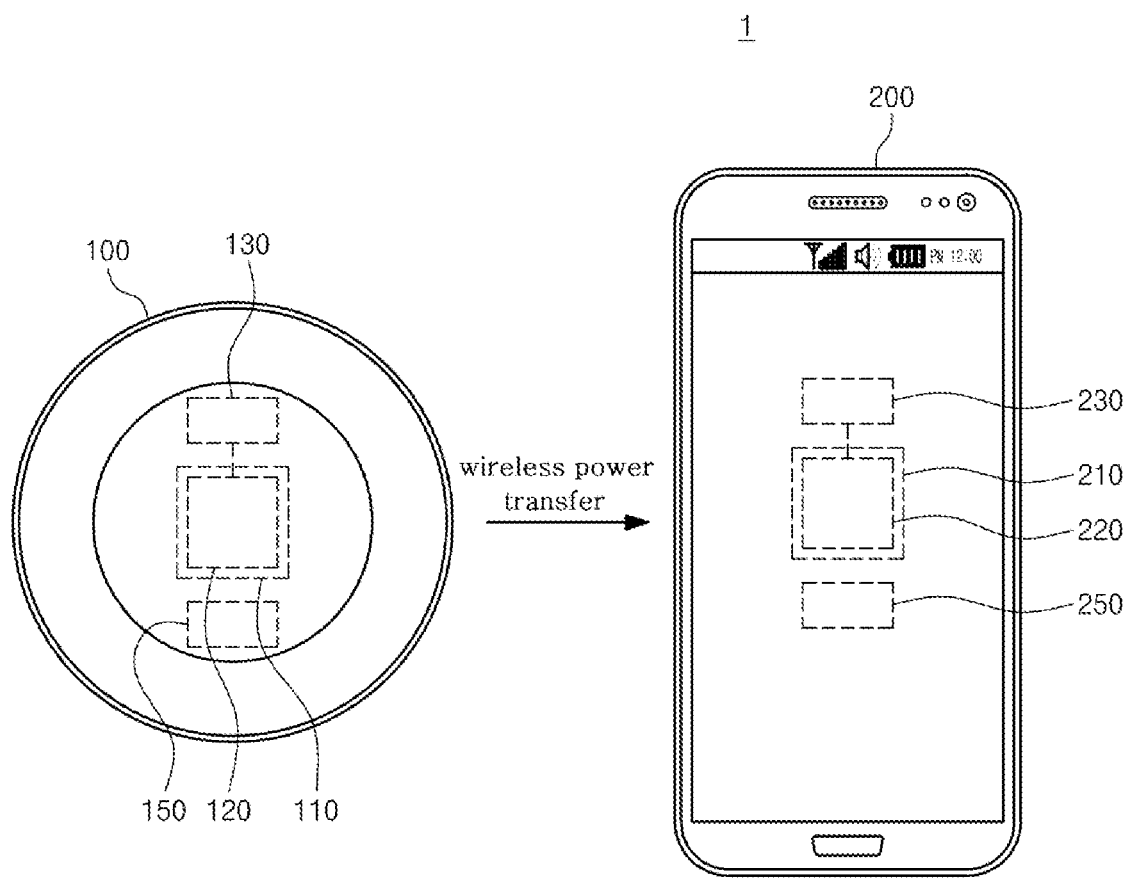
FIG. 1 illustrates examples of electronic devices to which a system for transferring power wirelessly according to an embodiment of the present disclosure can be applied.

Other advantages and features of the present disclosure, as well as the methods for arriving at such, will become clearer from the embodiments described in detail herein taken together with the appended drawings. However, the present disclosure is not limited by the embodiments disclosed below and can be implemented in various different forms. The embodiments are provided merely for the purpose of more comprehensively disclosing the present disclosure and to enable a comprehensive understanding of the scope of the present disclosure for those of ordinary skill in the field of art to which the present disclosure pertains. The present disclosure is to be defined only by the scope of claims set forth below.

All terms used herein (including technical or scientific terms) have the same meanings as those generally accepted in the context of technology common in the field of art to which the present disclosure pertains. Terms defined in typical dictionaries can be interpreted as having the same meanings as those in related technology and/or in the present specification, and certain expressions that are not clearly defined herein should not be conceptualized or overly formalized in its interpretation. The terms used in the present specification are merely for describing the embodiments and are not intended to limit the present disclosure.

In the present specification, an expression used in the singular encompasses the expression of the plural, unless specifically stated otherwise. In the present specification, it is to be understood that the expression 'include' and/or its various conjugates such as 'includes,' 'including,' 'included,' etc., used in reference to a composition, element, step, operation, and/or component does not preclude the presence or addition or one or more other composition, element, step, operation, and/or component. The same applies for the expressions 'comprise,' 'have,' and the like.

The present disclosure relates to a wireless power transmitter device and a wireless power receiver device that transfer power wirelessly, and to a system for transferring power wirelessly that includes such transmitter and receiver devices. More particularly, the present disclosure relates to wireless power transmitter and receiver devices that can improve power transfer efficiency in the presence of offset without increasing the sizes of the wireless power transmitter and receiver devices.

A wireless power transmitter device according to an embodiment of the present disclosure can include a driving coil configured to transmit power wirelessly, a magnetic coupler mutually inductively coupled with the driving coil, and a resonance frequency adjuster part configured to adjust the resonance frequency of the magnetic coupler, where the magnetic coupler can include a multiple number of coils arranged in a region opposite one side of the driving coil. Thus, the resonance frequency adjuster part can adjust the resonance frequency of each coil of the magnetic coupler such that an optimum field distribution is achieved in accordance with the horizontal movement of the wireless power transmitter device or wireless power receiver device, making it possible to compensate for decreases in transfer efficiency caused by an offset.

In the present specification, the area of a coil can refer to the area formed by the outermost loop.

FIG. 1 illustrates examples of electronic devices to which a system for transferring power wirelessly according to an embodiment of the present disclosure can be applied.

As shown in FIG. 1, a wireless power transmitter device 100 in a system 1 for transferring power wirelessly according to an embodiment of the present disclosure can be applied to a wireless charging device for wirelessly charging the power of a cell phone, while a wireless power receiver device 200 can be applied to the cell phone 200 that receives power wirelessly from the wireless power transmitter device 100 to charge its power. In one embodiment, the wireless power transmitter device 100 can include a driving coil 110 that transmits power wirelessly, a magnetic coupler 120 that is mutually inductively coupled with the driving coil 110, and a resonance frequency adjuster part 130 that adjusts the resonance frequency of the magnetic coupler 120. Similarly, the wireless power receiver device 200 can include a driving coil 210 that transmits power wirelessly, a magnetic coupler 220 that is mutually inductively coupled with the driving coil 210, and a resonance frequency adjuster part 230 that adjusts the resonance frequency of the magnetic coupler 220. Also, the wireless power transmitter device 100 and the wireless power receiver device 200 can further include sensor parts 150, 250 that measure at least one of the position and the direction of the wireless power receiver device 200 relative to the wireless power transmitter device 100. The resonance frequency adjuster part 130, 230 can adjust the resonance frequency of the magnetic coupler 120, 220 according to at least one of the position and direction detected at the sensor part 150, 250. The magnetic coupler 120, 220 can include a multiple number of coils arranged in a region opposite one side of the driving coil. The one side of the driving coil can refer to the side where power is transmitted or received. That is, for a wireless power transmitter device, the one side of the driving coil can be the side of the driving coil where power is wirelessly transmitted, and for a wireless power receiver device, the one side of the driving coil can be the side of the driving coil where power is wirelessly received. In one embodiment, the multiple coils of the magnetic can each include an inductor and a variable capacitor. In this case, the resonance frequency adjuster part 230 can adjust the resonance frequency differently for each coil such that an optimum magnetic field distribution is obtained according to any one of the position and direction of the wireless power receiver device 200 relative to the wireless power transmitter device 100. In one embodiment, the resonance frequency adjuster part 130, 230 can adjust the resonance frequency by adjusting the capacitance of the variable capacitor mounted on each coil of the magnetic coupler according to any one of the position and direction of the wireless power receiver device 200 relative to the wireless power transmitter device 100. The resonance frequency adjuster part 130, 230 for example can be, but is not limited to, a varactor diode. In this manner, when there is an offset between the wireless power transmitter device 100 and the wireless power receiver device 200, the resonance frequencies of the multiple coils can be modified to optimize the magnetic field distribution for each position, thereby overcoming the decrease in power transfer efficiency which may otherwise result from the offset.

According to an embodiment of the present disclosure, a variable capacitor including a varactor diode can be connected in series to at least some of the multiple number of coils. Of course, it should be obvious to the skilled person that the variable capacitor can be connected in any manner that enables it to modify the resonance frequency of the coil.

Figure 2:
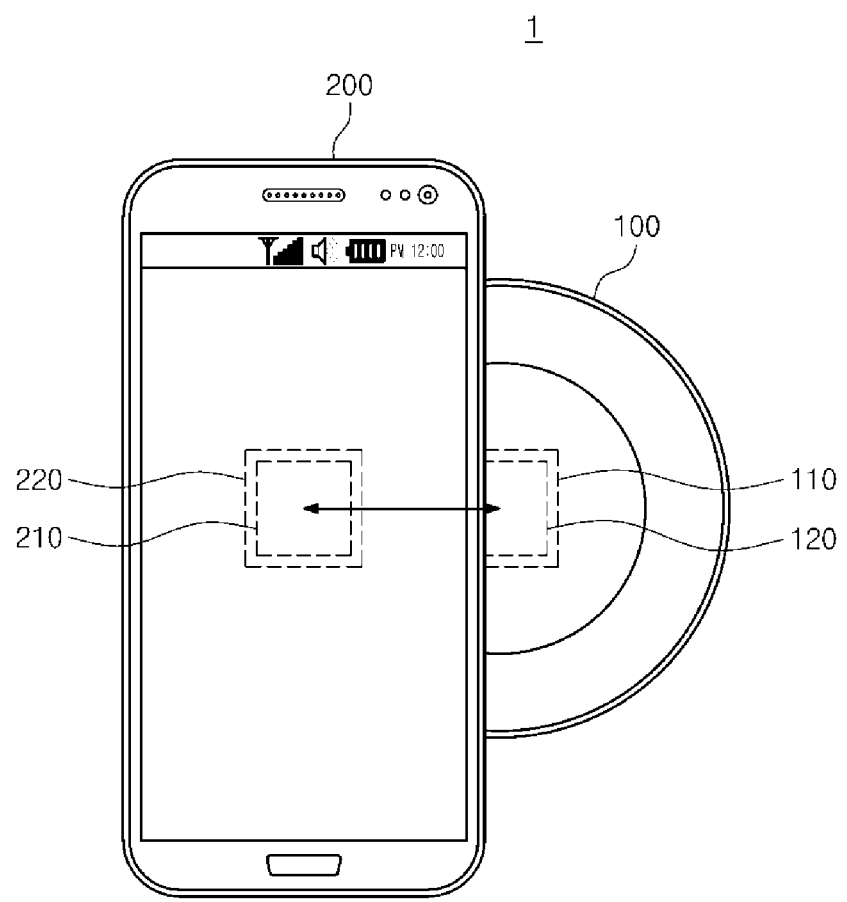
FIG. 2 illustrates an example in which the power transmitter device and the power receiver device are in a misaligned state in a system for transferring power wirelessly according to an embodiment of the present disclosure.

FIG. 2 illustrates an example in which the power transmitter device 100 and the power receiver device 200 are in a misaligned state in a system for transferring power wirelessly according to an embodiment of the present disclosure.

As shown in FIG. 2, in cases where the driving coil 110 wirelessly transmitting power and the driving coil 210 wirelessly receiving power are misaligned so that there is an offset (represented by an arrow) between the driving coils 110, 210, existing technology may suffer from a decrease in transfer efficiency or even an occurrence of a transfer null point at which there is no transfer of power at all. Thus, based on an embodiment of the present disclosure, a description is provided below of the structure of a magnetic coupler that is capable of resolving the problem of decreased transfer efficiency and removing the transfer null point even in the presence of misalignment, i.e. an offset, between the power transmitter side and the power receiver side.

Figure 3:
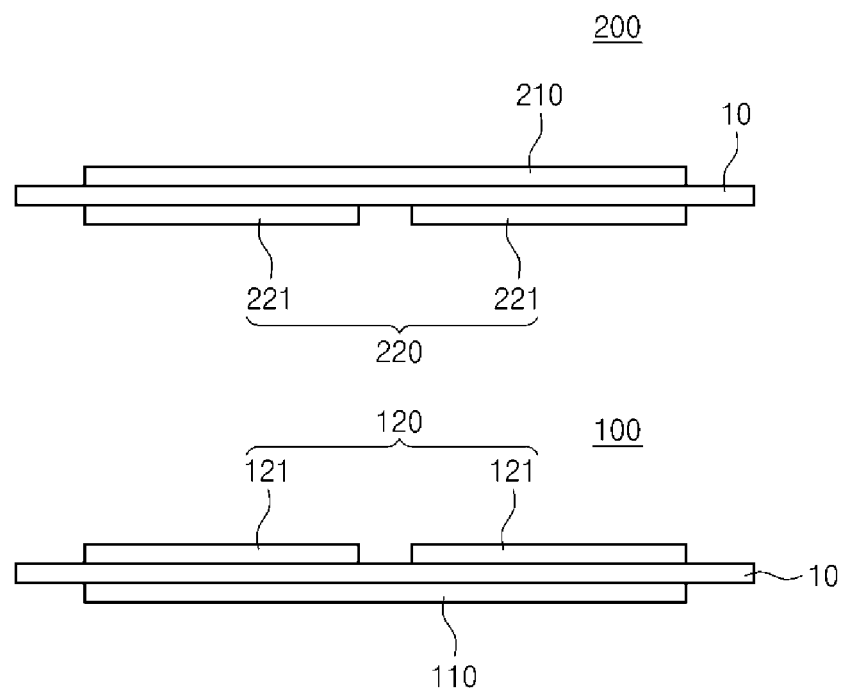
FIG. 3 is a front elevational view illustrating a wireless power transmitter device and a wireless power receiver device according to an embodiment of the present disclosure, as well as the arrangement of driving coils and magnetic couplers in the wireless power transmitter device and the wireless power receiver device.

FIG. 3 is a front elevational view illustrating a wireless power transmitter device and a wireless power receiver device according to an embodiment of the present disclosure, as well as the arrangement of driving coils and magnetic couplers in the wireless power transmitter device and the wireless power receiver device.

As illustrated in FIG. 3, a driving coil 110 provided in a wireless power transmitter device 100 according to an embodiment of the present disclosure can be arranged on one side of a substrate 10, and the multiple number of coils 121 of the magnetic coupler 120 can be arranged in a region opposite the driving coil 110 on the other side of the substrate 10. In like manner, a driving coil 210 provided in a wireless power receiver device 200 according to an embodiment of the present disclosure can be arranged on one side of a substrate 10, and the multiple number of coils 221 of the magnetic coupler 220 can be arranged respectively in regions opposite the driving coil 210 on the other side of the substrate 10.

A description is provided below on the power transfer efficiency obtained according to the structure of a magnetic coupler according to an embodiment of the present disclosure with reference to various examples and their corresponding simulation results.

Figure 4:
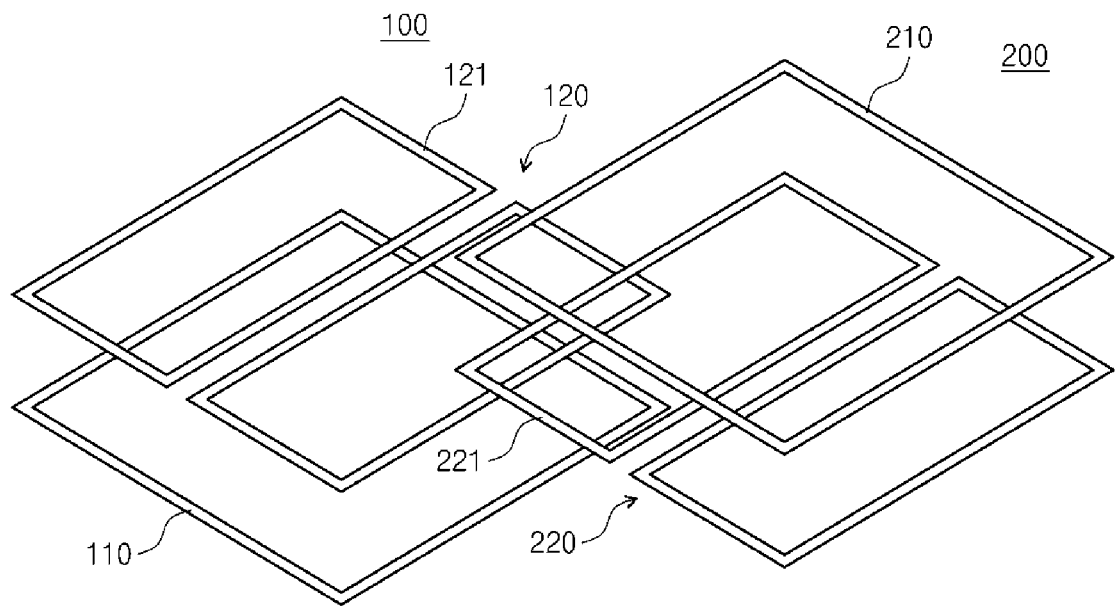
FIG. 4 is a perspective view conceptually illustrating the structure of magnetic couplers according to Example 1 based on an embodiment of the present disclosure.

FIG. 4 is a perspective view conceptually illustrating the structure of magnetic couplers according to Example 1 based on an embodiment of the present disclosure.

As illustrated in FIG. 4, the magnetic coupler 120 of a wireless power transmitter device 100 according to Example 1 based on an embodiment of the present disclosure includes two coils 121 arranged respectively in two regions that are positioned opposite the driving coil 110 and are separated along the left-right direction. In certain examples, the areas of the coils included in the magnetic coupler can be equal to or smaller than the area of the driving coil. Also, the magnetic coupler 220 of the wireless power receiver device 200, in like manner to the magnetic coupler 120 included in the wireless power transmitter device 100, includes two coils 221 arranged respectively in two regions that are positioned opposite the driving coil 210 and are separated along the left-right direction. The width of the driving coil 210 is about 200 mm, and the same driving coils are used in the different examples and the comparative example disclosed below. The magnetic coupler 120, 220 can be included in similar fashion in both the wireless transmitter device 100 and the wireless receiver device 200 as in Example 1 illustrated in FIG. 4, but the present disclosure is not limited thus. For example, a magnetic coupler 120, 220 can be included in just one of the wireless transmitter device 100 or the wireless receiver device 200, or the magnetic couplers 120, 220 can be provided in different arrangements.

Figure 5:
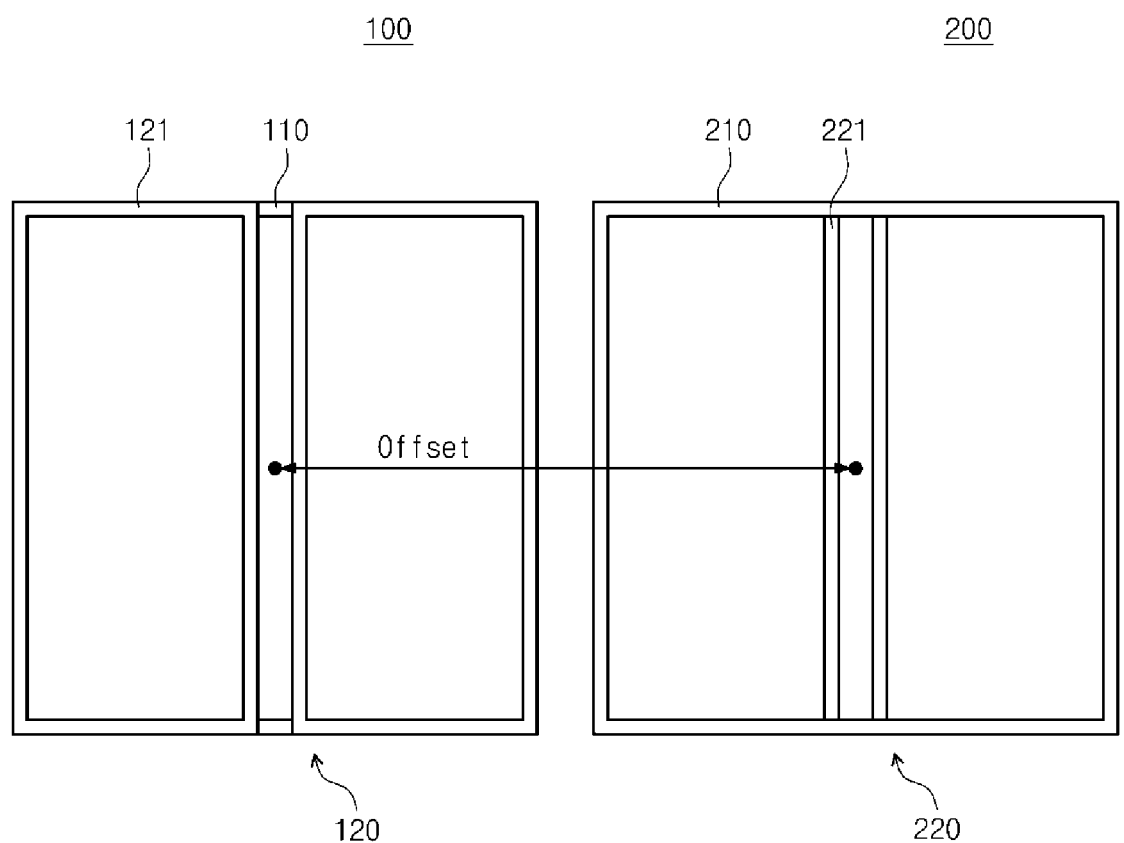
FIG. 5 is a plan view of the structure shown in FIG. 4.

FIG. 5 is a plan view of the structure shown in FIG. 4.

The transfer efficiency in relation to the offset associated with a left-right movement of the wireless receiver device 200 relative to the wireless transmitter device 100, as illustrated in FIG. 5, was observed using simulations for the magnetic couplers 120, 220 of Example 1.

Figure 6:
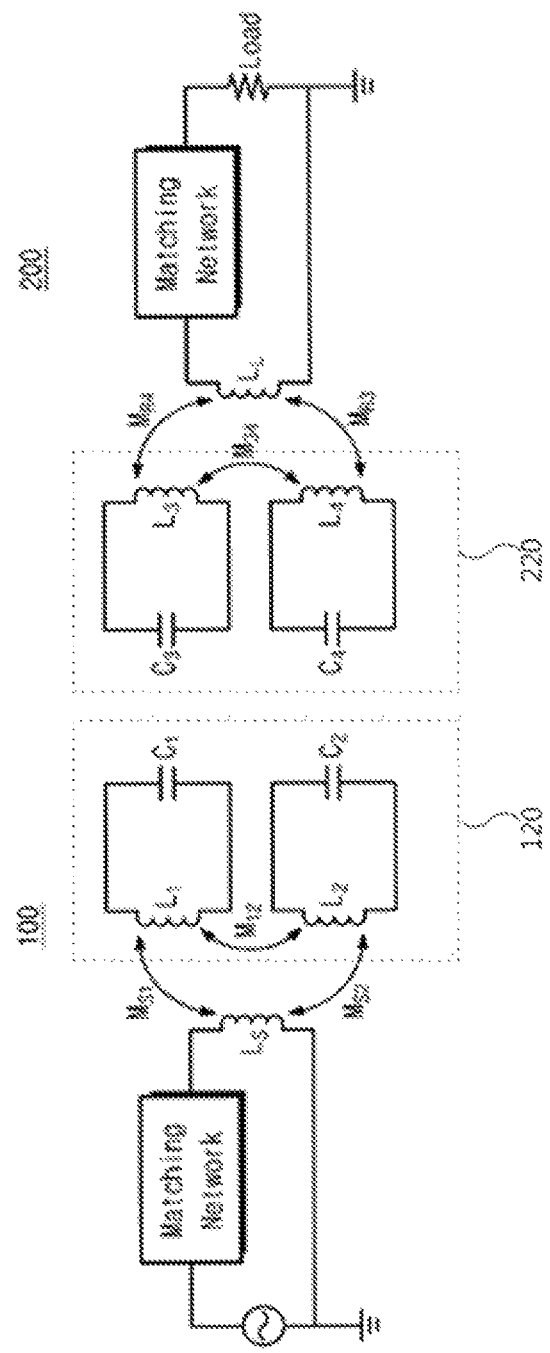
FIG. 6 is a circuit diagram of a system for transferring power wirelessly that is equipped with magnetic couplers according to Example 1 based on an embodiment of the present disclosure.

FIG. 6 is a circuit diagram of a system for transferring power wirelessly that is equipped with the magnetic couplers according to Example 1 based on an embodiment of the present disclosure.

As illustrated in FIG. 6, the magnetic couplers 120, 220 according to Example 1 each include two coils, each of which may include an inductor and a capacitor, and are mutually inductively coupled with the driving coils. In an embodiment of the present disclosure, the capacitors included in a magnetic coupler 120, 220 may be variable capacitors and may be adjusted by the resonance frequency adjuster part to have optimum capacitance values according to the offset, as shown in Table 1. By thus adjusting the resonance frequencies of multiple coils differently according to the offset, the decrease in power transfer efficiency which may otherwise result from the presence of an offset can be prevented.

TABLE 1

| Offset (mm) | C1 (pF) | C2 (pF) |
|---|---|---|
| 0 | 528 | 528 |
| 60 | 617 | 272 |
| 120 | 775 | Short |
| 180 | 852 | 1863 |

Figure 7:
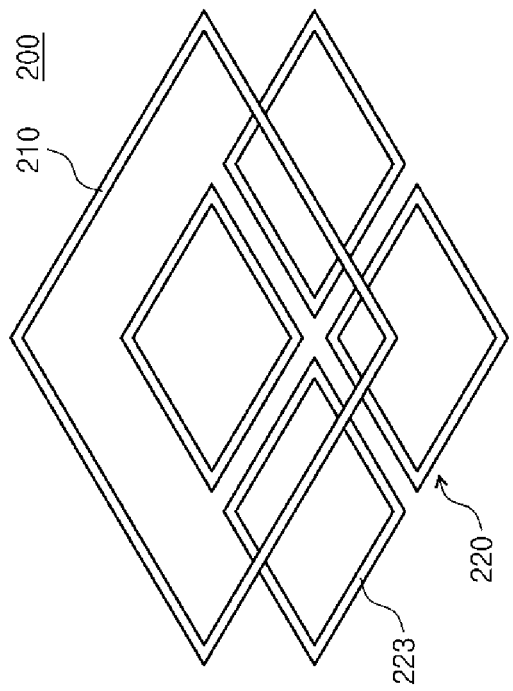
FIG. 7 is a perspective view conceptually illustrating the structure of magnetic couplers according to Example 2 based on an embodiment of the present disclosure.
Figure 7:
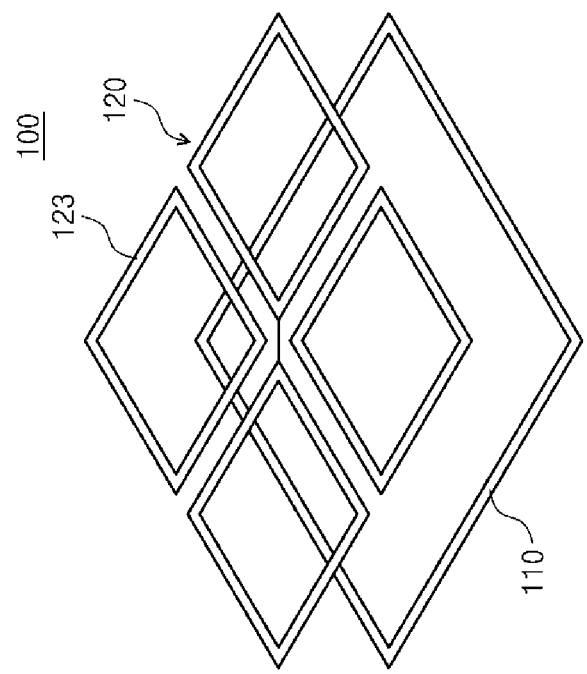

FIG. 7 is a perspective view conceptually illustrating the structure of magnetic couplers according to Example 2 based on an embodiment of the present disclosure.

As illustrated in FIG. 7, the magnetic coupler 120 of a wireless power transmitter device 100 according to Example 2 based on an embodiment of the present disclosure includes four coils 123 arranged respectively in four regions that are positioned opposite the driving coil 110 and are separated along the left-right direction and up-down direction. Also, the magnetic coupler 220 of the wireless power receiver device 200, in similar fashion to the magnetic coupler 120 included in the wireless transmitter device 100, includes four coils 223 arranged respectively in four regions that are positioned opposite the driving coil 210 and are separated along the left-right direction and the up-down direction.

Figure 8:
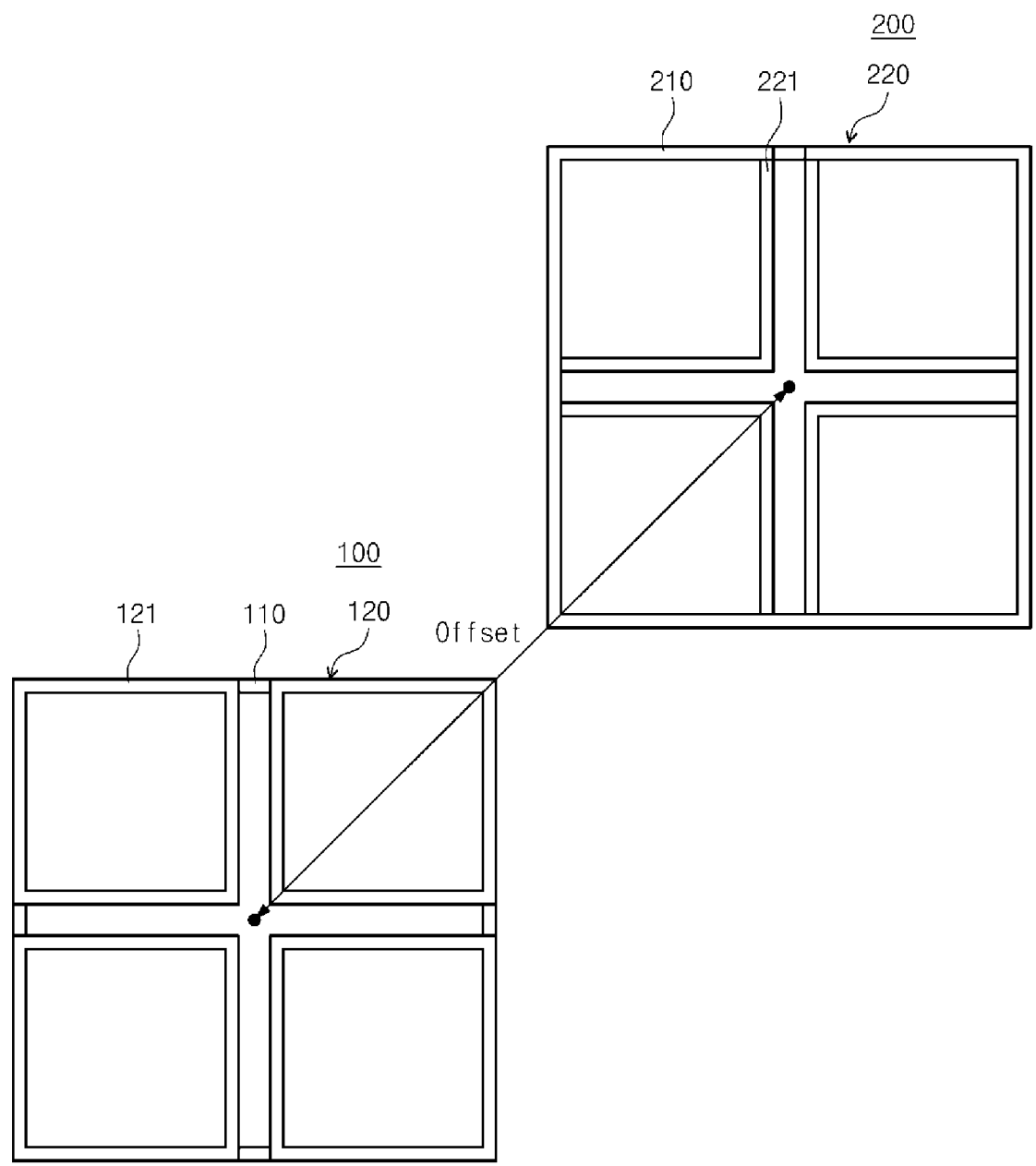
FIG. 8 is a plan view of the structure shown in FIG. 7.

FIG. 8 is a plan view of the structure shown in FIG. 7.

The transfer efficiency in relation to the offset associated with a left-right movement and an up-down movement of the wireless receiver device 200 relative to the wireless transmitter device 100, as illustrated in FIG. 8, was observed using simulations for the magnetic couplers 120, 220 of Example 2.

Figure 9:
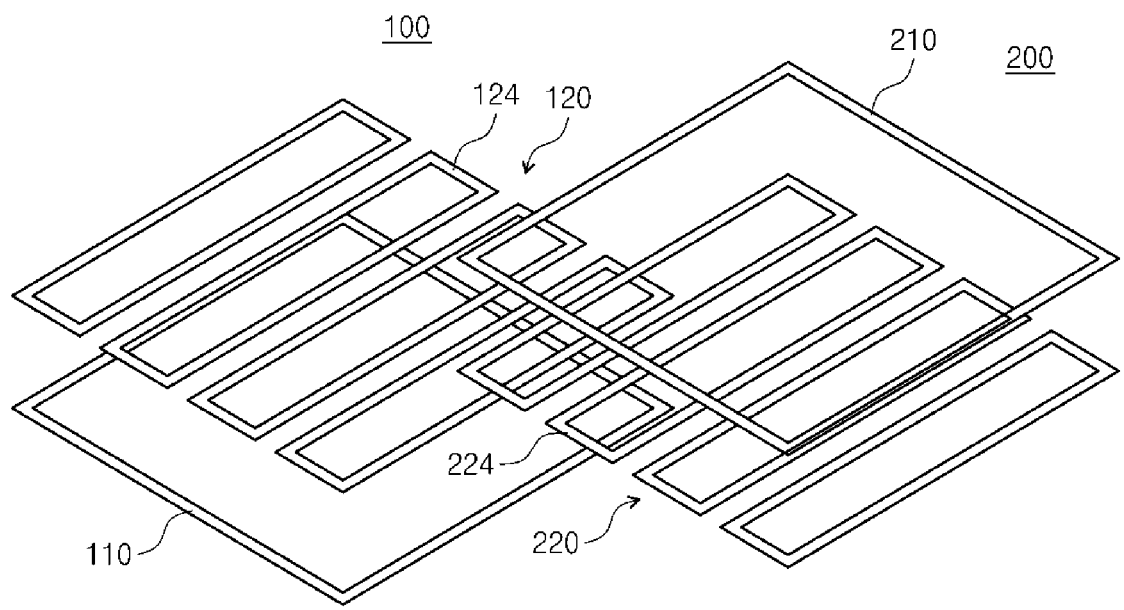
FIG. 9 is a perspective view conceptually illustrating the structure of magnetic couplers according to Example 3 based on an embodiment of the present disclosure.

FIG. 9 is a perspective view conceptually illustrating the structure of a magnetic coupler according to Example 3 based on an embodiment of the present disclosure.

As illustrated in FIG. 9, the magnetic coupler 120 of a wireless power transmitter device 100 according to Example 3 based on an embodiment of the present disclosure includes four coils 124 arranged respectively in four regions that are positioned opposite the driving coil 110 and are separated along the left-right direction. Also, the magnetic coupler 220 of the wireless power receiver device 200, in similar fashion to the magnetic coupler 120 included in the wireless transmitter device 100, includes four coils 224 arranged respectively in four regions that are positioned opposite the driving coil 210 and are separated along the left-right direction.

Figure 10:
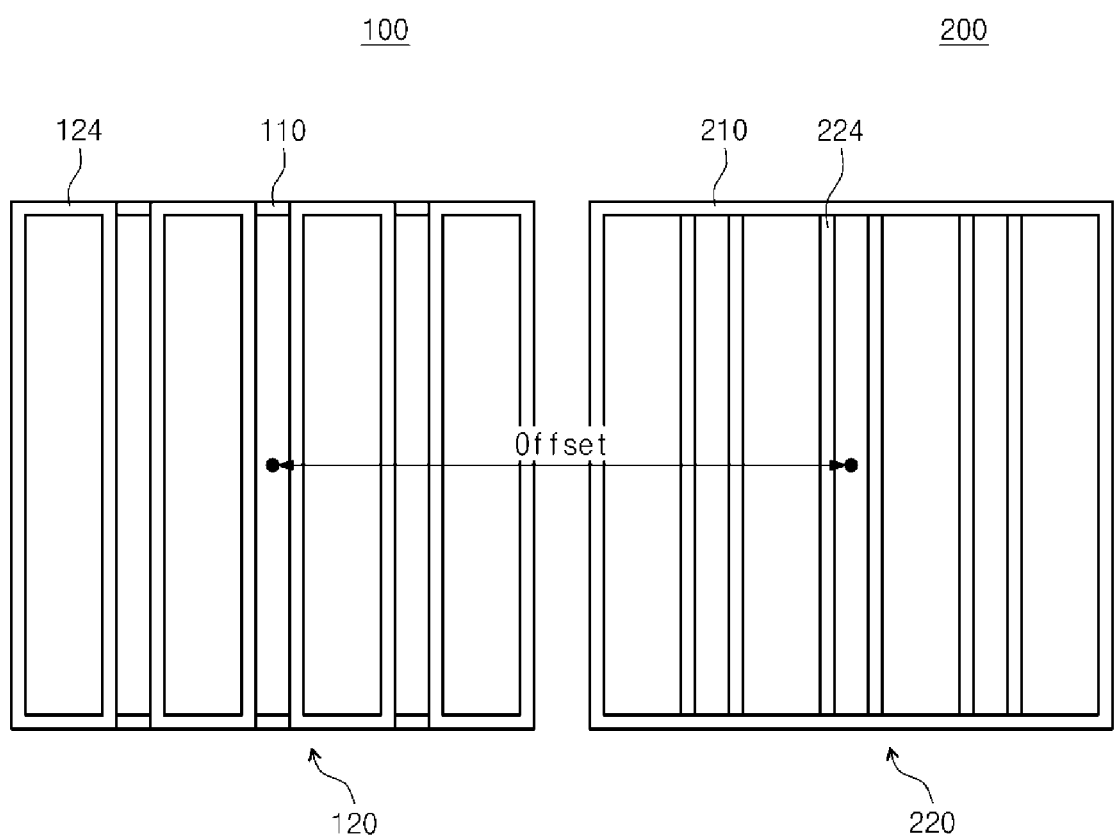
FIG. 10 is a plan view of the structure shown in FIG. 9.

FIG. 10 is a plan view of the structure shown in FIG. 9.

The transfer efficiency in relation to the offset associated with a left-right movement of the wireless receiver device 200 relative to the wireless transmitter device 100, as illustrated in FIG. 10, was observed using simulations for the magnetic couplers 120, 220 of Example 3.

Figure 11:
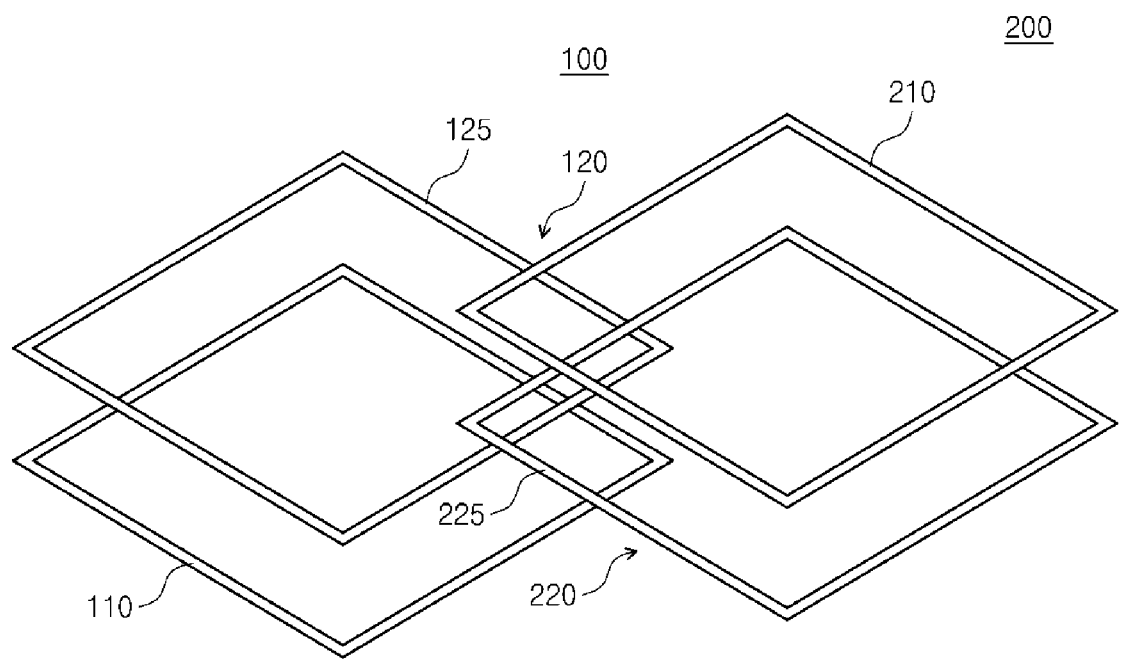
FIG. 11 is a perspective view conceptually illustrating the structure of magnetic couplers according to a comparative example.

FIG. 11 is a perspective view conceptually illustrating the structure of a magnetic coupler according to a comparative example.

As illustrated in FIG. 11, the magnetic coupler 120 of a wireless power transmitter device 100 according to the comparative example includes one coil 125 in one region opposite the driving coil 110. Also, the magnetic coupler 220 of the wireless power receiver device 200, in similar fashion to the magnetic coupler 120 included in the wireless transmitter device 100, includes one coil 225 in one region opposite the driving coil 210.

Figure 12:
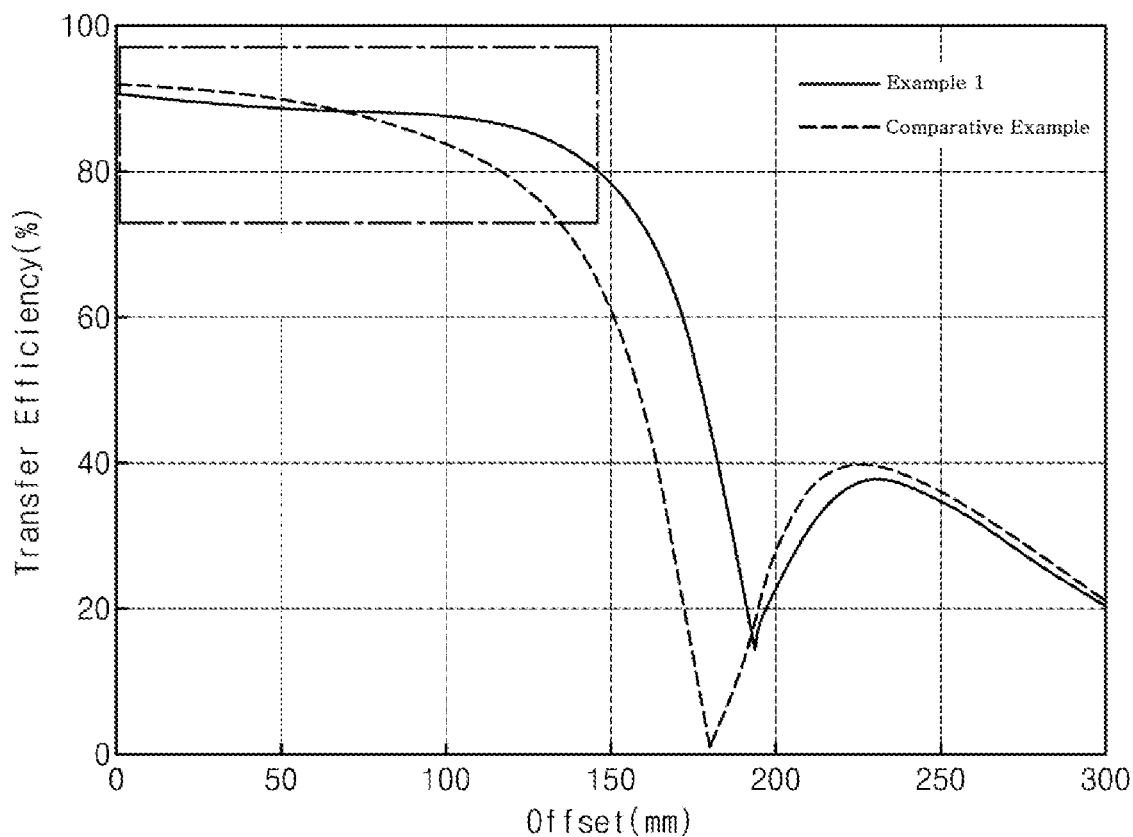
FIG. 12 is a graph representing the transfer efficiencies of the magnetic couplers according to Example 1 based on an embodiment of the present disclosure and the comparative example in relation to offset along a left-right direction.

FIG. 12 is a graph representing the transfer efficiencies of the magnetic couplers according to Example 1 based on an embodiment of the present disclosure and the comparative example in relation to offset along a left-right direction.

Referring to FIG. 12, it can be seen that Example 1 provides a transfer efficiency of 80% or higher in a wider range of offset compared to the case of the comparative example. It can also be seen that, whereas a transfer null point, where no transfer of power occurs at all, is observed with the comparative example at an offset of around 180 mm, a transfer null point is not observed with Example 1. Thus, it can be seen that, when there is an offset along the left-right direction, it is possible to improve transfer efficiency by using a magnetic coupler having multiple coils arranged in regions that are separated along the left-right direction as in Example 1.

Figure 13:
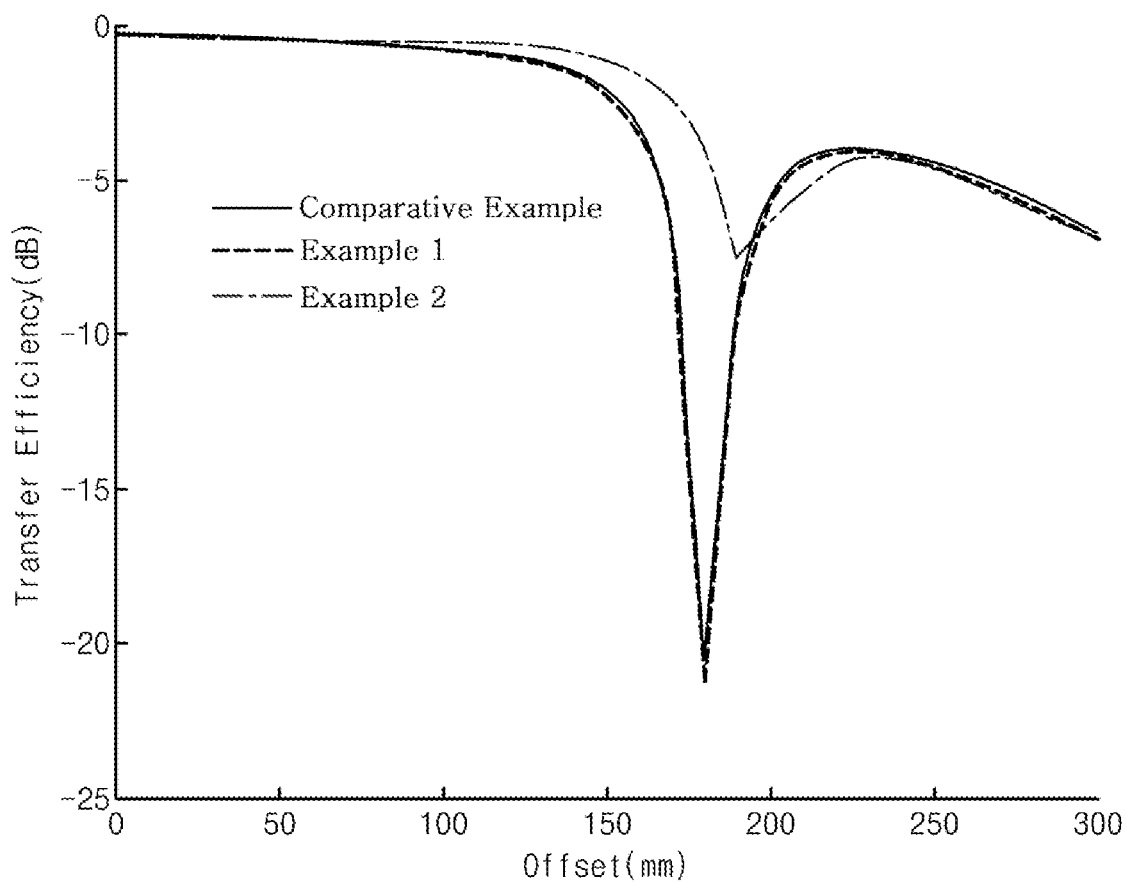
FIG. 13 is a graph representing the transfer efficiencies of the magnetic couplers according to Example 1 and Example 2 based on embodiments of the present disclosure and the comparative example in relation to offset along an up-down direction.

FIG. 13 is a graph representing the transfer efficiencies of the magnetic couplers according to Example 1 and Example 2 based on embodiments of the present disclosure and the comparative example in relation to offset along an up-down direction.

Referring to FIG. 13, it can be seen that Example 2 provides a considerably higher transfer efficiency than those of Example 1 and the comparative example. It can be seen that, in spite of the multiple coils arranged in separated regions in the magnetic couplers of Example 1, the magnetic couplers of Example 1 provide similar results to those of the comparative example, because the structure of the coils is such that the coils are separated only with respect to the left-right direction and not separated with respect to the up-down direction, so that there is no compensation for the up-down movement.

Thus, from the simulation results of FIG. 12 and FIG. 13, it can be seen that the structure having multiple coils disposed in regions separated along the directions of movement of the wireless power receiver device relative to the wireless power transmitter device can improve transfer efficiency in the presence of offset.

Figure 14:
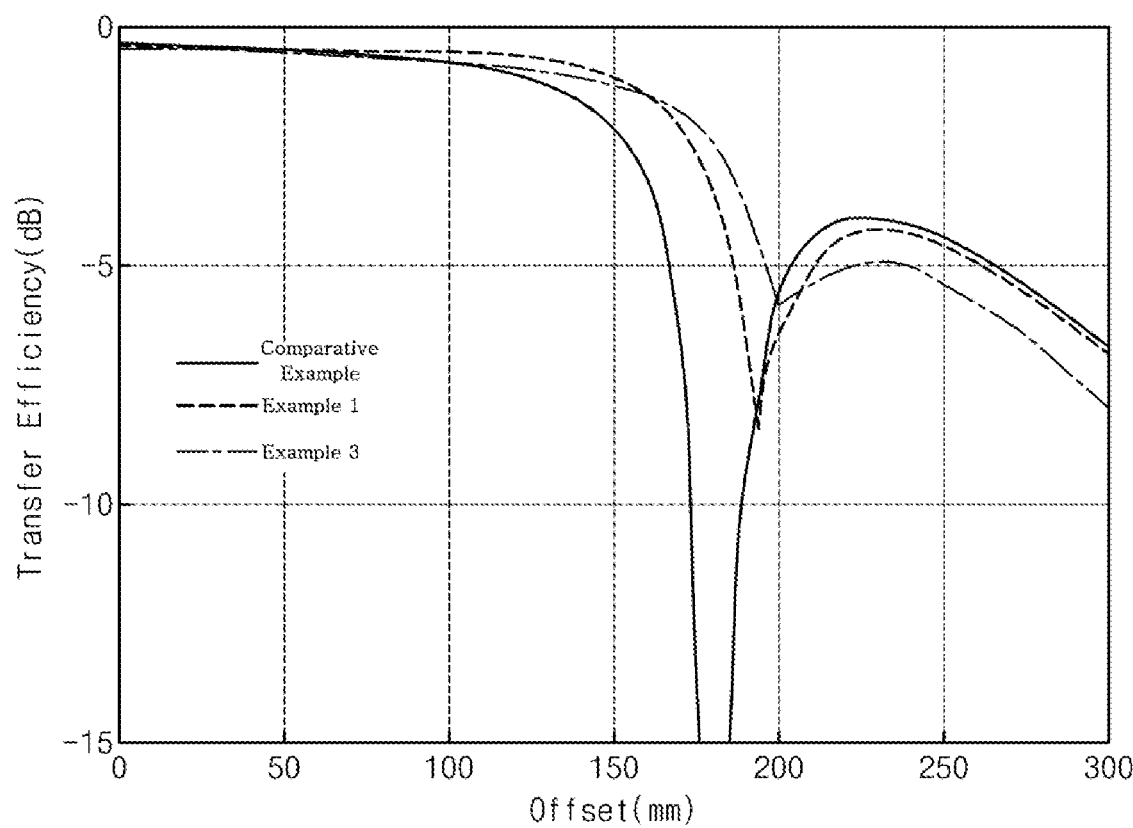
FIG. 14 is a graph representing the transfer efficiencies of the magnetic couplers according to Example 1 and Example 3 based on embodiments of the present disclosure and the comparative example in relation to offset along a left-right direction.

FIG. 14 is a graph representing the transfer efficiencies of the magnetic couplers according to Example 1 and Example 3 based on embodiments of the present disclosure and the comparative example in relation to offset along a left-right direction.

Referring to FIG. 14, it can be seen that Example 1 and Example 3 both provide considerably higher transfer efficiencies than that of the comparative example and that the case having coils arranged in regions with more separations along the movement direction as in Example 3 is especially more effective in improving transfer efficiency.

Figure 15:
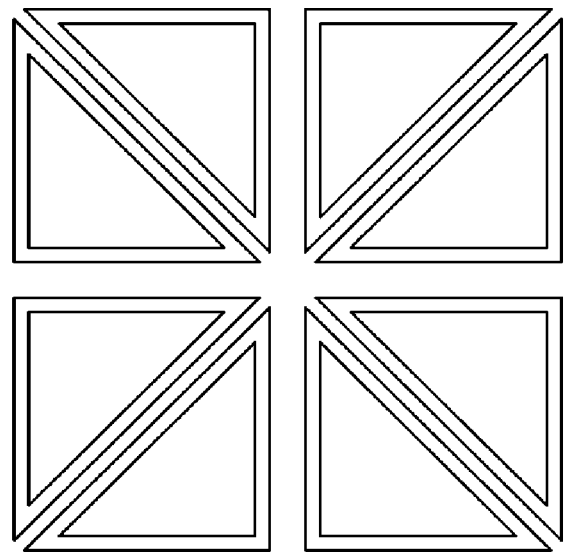
FIG. 15 illustrates the structure of a magnetic coupler according to another embodiment of the present disclosure.

FIG. 15 illustrates the structure of a magnetic coupler according to another embodiment of the present disclosure.

Based on the simulation results for the examples illustrated above, it is conceivable to arrange the coils of a magnetic coupler in regions that are separated along the radial direction, as illustrated in FIG. 15, to compensate for the decrease in transfer efficiency when there is a change in orientation formed between the wireless power transmitter device and the wireless power receiver device, for example when the transmitter device or the receiver device is rotated.

Figure 16:
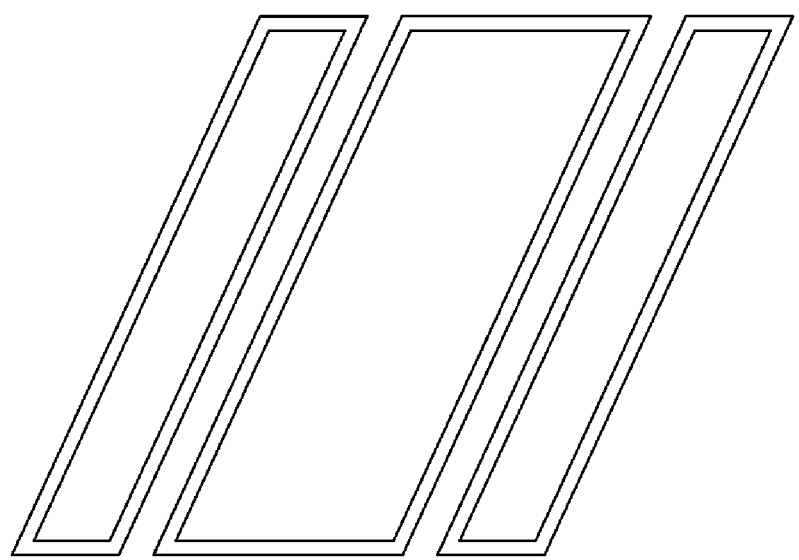
FIG. 16 illustrates the structure of a magnetic coupler according to yet another embodiment of the present disclosure.

FIG. 16 illustrates the structure of a magnetic coupler according to yet another embodiment of the present disclosure.

The coils of a magnetic coupler according to an embodiment of the present disclosure need not be limited to having the same areas for the coils, as is the case in the embodiments described above. Rather, the coils can be arranged symmetrically with different areas, as illustrated in FIG. 16, to further improve transfer efficiency.

The embodiments and examples set forth above are presented merely to allow an easier understanding of the present disclosure and do not limit the scope of the invention in any way. It should be understood that numerous embodiments conceived as variations of the above are encompassed within the scope of the invention. For example, each of the elements illustrated with reference to an embodiment of the present disclosure can be implemented in a distributed form, and conversely elements described as being separate from one another can be implemented in an integrated form. The technical scope of protection of the present disclosure is to be defined by the technical spirit set forth in the scope of claims, where the technical scope of protection of the present disclosure is not limited only to the literal disclosure of the claims but rather encompasses the scope of technological equivalents.

What is claimed is:

1. A wireless power transmitter device comprising: a driving coil configured to transmit power wirelessly; a magnetic coupler mutually inductively coupled with the driving coil, wherein the magnetic coupler comprises a plurality of coils arranged in a region opposite one side of the driving coil and variable capacitors are installed on each coil of the magnetic coupler respectively, wherein the plurality of coils are arranged on a same plane; a sensor part configured to detect an offset between the driving coil and a wireless power receiver receiving the power wirelessly, wherein the sensor part detects the offset when the driving coil of the wireless power transmitter is misaligned and does not overlap with a driving coil of the wireless power receiver in a up-down direction; and a resonance frequency adjuster part configured to adjust a resonance frequency of the magnetic coupler, wherein, when the offset between the driving coil and the wireless power receiver is detected by the sensor part, the resonance frequency adjuster part adjusts the resonant frequency of each coil of the magnetic coupler to optimize a magnetic field distribution by compensating decrease in power transfer efficiency due to the offset, wherein the resonance frequency adjuster part adjusts the resonance frequency by adjusting capacitances of the variable capacitors installed on each coil of the magnetic coupler according to the offset detected by the sensor part.

2. The wireless power transmitter device of claim 1, wherein the plurality of coils are arranged along at least one direction of an up/down direction, left/right direction, and a radial direction on the same plane.

3. The wireless power transmitter device of claim 2, wherein the plurality of coils are arranged symmetrically, and at least two of the plurality of coils are provided to have a different area.

4. The wireless power transmitter device of claim 1, wherein the sensor part detects the position by measuring at least one of a position and a direction of the wireless power receiver relative to the wireless power transmitter.

5. The wireless power transmitter device of claim 4, wherein the magnetic coupler further comprises inductors installed on the plurality of coils respectively.

6. The wireless power transmitter device of claim 1, wherein the resonance frequency adjuster part adjusts the resonance frequency differently for each coil according to the position of the wireless power receiver detected by the sensor part.

7. A wireless power receiver device comprising: a driving coil configured to receive power wirelessly; a magnetic coupler mutually inductively coupled with the driving coil, wherein the magnetic coupler comprises a plurality of coils arranged in a region opposite one side of the driving coil and variable capacitors are installed on each coil respectively, wherein the plurality of coils are arranged on a same plane; a sensor part configured to detect an offset between the driving coil and a wireless power transmitter transmitting the power wirelessly, wherein the sensor part detects the offset when the driving coil of the wireless power receiver is misaligned and does not overlap with a driving coil of the wireless power transmitter in a up-down direction; and a resonance frequency adjuster part configured to adjust a resonance frequency of the magnetic coupler, wherein, when the offset between the driving coil and the wireless power transmitter is detected by the sensor part, the resonance frequency adjuster part adjusts the resonant frequency of each coil of the magnetic coupler to optimize a magnetic field distribution by compensating decrease in power transfer efficiency due to the offset, wherein the resonance frequency adjuster part adjusts the resonance frequency by adjusting capacitances of the variable capacitors installed on each coil of the magnetic coupler according to the offset detected by the sensor part.

8. The wireless power receiver of claim 7, wherein the plurality of coils are arranged along at least one direction of an up-down direction, left-right direction, and a radial direction on the same plane.

9. The wireless power receiver of claim 8, wherein the plurality of coils are arranged symmetrically, and at least two of the plurality of coils are provided to have a different area.

10. The wireless power receiver of claim 7, wherein the sensor part detects the position by measuring at least one of a position and a direction of the wireless power transmitter relative to the wireless power receiver.

11. The wireless power receiver of claim 10, wherein the magnetic coupler further comprises inductors installed on the plurality of coils respectively.

12. The wireless power receiver of claim 11, wherein the resonance frequency adjuster part adjusts the resonance frequency differently for each coil according to the position of the wireless power transmitter detected by the sensor part.

13. A wireless power transmitter device comprising: a driving coil configured to transmit power wirelessly; a magnetic coupler mutually inductively coupled with the driving coil and comprising a plurality of coils; a resonance frequency adjuster part configured to adjust a resonance frequency of the magnetic coupler; and a sensor part configured to detect an offset by measuring at least one of a position and a direction of a wireless power receiver receiving the power wirelessly relative to the wireless power transmitter, wherein the sensor part detects the offset when the driving coil of the wireless power transmitter is misaligned and does not overlap with a driving coil of the wireless power receiver in a up-down direction, wherein, when the offset between the wireless power transmitter and the wireless power receiver is detected by the sensor part, the resonance frequency adjuster part adjusts the resonant frequency of each coil of the magnetic coupler to optimize a magnetic field distribution by compensating decrease in power transfer efficiency due to the offset, wherein the magnetic coupler further comprises variable capacitors installed on each of the plurality of coils respectively and capacitances of the variable capacitors are adjusted according to the offset measured by the sensor part, wherein the plurality of coils are arranged on a same plane.

14. The wireless power transmitter device of claim 13, wherein the resonance frequency adjuster part adjusts a resonance frequency of each variable capacitor differently according to at least one of the position and the direction of the wireless power receiver measured by the sensor part.

15. A wireless power receiver device comprising: a driving coil configured to receive power wirelessly; a magnetic coupler mutually inductively coupled with the driving coil and comprising a plurality of coils; a resonance frequency adjuster part configured to adjust a resonance frequency of the plurality of coils; and a sensor part configured to detect an offset between the driving coil and a wireless power transmitter transmitting the power wirelessly, wherein the sensor part detects the offset when the driving coil of the wireless power receiver is misaligned and does not overlap with a driving coil of the wireless power transmitter in a up-down direction, wherein, when the offset between the driving coil and the wireless power transmitter is detected by the sensor part, the resonance frequency adjuster part adjusts the resonant frequency of each coil of the magnetic coupler to optimize a magnetic field distribution by compensating decrease in power transfer efficiency due to the offset, wherein the magnetic coupler further comprises variable capacitors installed on each of the plurality of coils respectively and capacitances of the variable capacitors are adjusted according to the offset detected by the sensor part, wherein the plurality of coils are arranged on a same plane.

16. The wireless power receiver device of claim 15, wherein inductors are installed on the plurality of coils, and the resonance frequency adjuster part adjusts a resonance frequency of each variable capacitor differently according to the position of the wireless power transmitter detected by the sensor part.

* * * * *